Aug. 20, 1968  H. B. ODELL  3,398,034
PROCESS AND MACHINE FOR MAKING ADHESIVE STRIP PRODUCTS
Filed Feb. 9, 1965  2 Sheets-Sheet 1
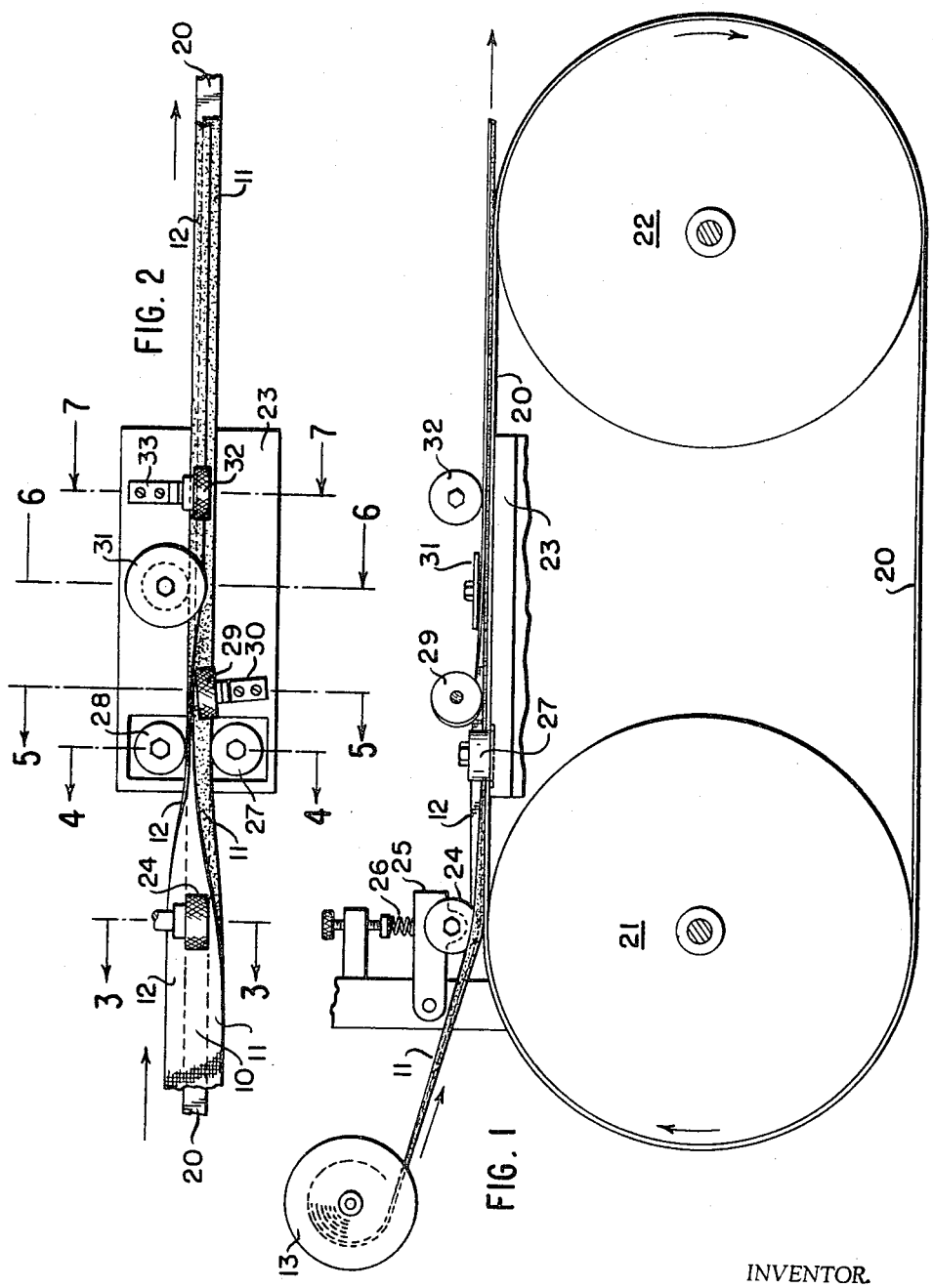
INVENTOR.
HORACE B. ODELL Aug. 20, 1968  H. B. ODELL  3,398,034
PROCESS AND MACHINE FOR MAKING ADHESIVE STRIP PRODUCTS
Filed Feb. 9, 1965  2 Sheets-Sheet 2

INVENTOR.
HORACE B. ODELL
BY

United States Patent Office 3,398,034
Patented Aug. 20, 1968

3,398,034
PROCESS AND MACHINE FOR MAKING ADHESIVE STRIP PRODUCTS
Horace B. Odell, Wellesley, Mass., assignor to The Odell Co., Watertown, Mass., a corporation of Massachusetts
Filed Feb. 9, 1965, Ser. No. 431,286
8 Claims. (Cl. 156—203)

ABSTRACT OF THE DISCLOSURE

Process of making of sheet material a two-ply adhesive fastener having oppositely exposed external faces of substantially the same adhesive area and oppositely disposed internal non-adherent contacting faces, the process being characterized by folding edge zones of a tape while the body of the tape is temporarily adhered to a flat conveyor belt.

---

This invention comprises a novel process of making an adhesive two-ply strip fastener having tacky or pressure-sensitive exterior faces and includes within its scope a new and improved machine which is useful in carrying out the process.

The process is herein disclosed in its application to the production of adhesive fasteners for temporarily securing an insole to a last bottom as a preliminary step in the shoemaking industry, one surface of the fastener being adapted to make adhesive union with the insole and the other face being adapted to make adherent union with the bare last.

After many years of research an insole fastener has come into use that appears to be the answer to the age-old problem of eliminating insole tacking. This fastener comprises a short length of flexible fabric tape or tissue folded longitudinally, presenting a complete pressure-sensitive exterior surface and untreated interior surfaces. The fabric, in the form of a flattened tube, is adhesively sealed by overlapping marginal zones of the tape. When one of these fasteners is interposed between an insole and the bottom of a last it acts as a flattened adhesive wafer, tacky on both sides and serving to hold the insole securely in place. When it is desired to free the insole from the bottom of the last in removing the last the fastener is readily stripped with a rolling and folding or winding action of the superposed plies which are in contact through their non-adherent inner faces.

The process of the present invention is utilized in the preparation of a tubular strip product that may be readily severed into individual adhesive units of any desired length, as for example 1" to 1½" long, and applied automatically or by hand to the inner surface of an insole before or at the same time it is spotted upon the last bottom.

The process is characterized by the steps of feeding an adhesively coated and tacky tape to a traveling carrier, temporarily attaching a longitudinal zone of the tape by its adhesive-coated face to the carrier, folding inwardly the coated marginal zones of the tape in superposed relation to the attached zone, and stripping the folded and now flattened product thus formed from the carrier with both external faces in tacky condition.

The process above outlined may be carried out continuously at high speed with assurance that the tape is smoothly laid and spread upon the surface of he carrier. Its marginal zones are thus accurately folded and secured while the body of the tape is stabilized by its contact and temporary attachment to the carrier.

These and other features and advantages of the invention will be best understood and appreciated from the following description of a preferred manner of carrying out the process as suggested in the accompanying drawings in which—

Figure 8:
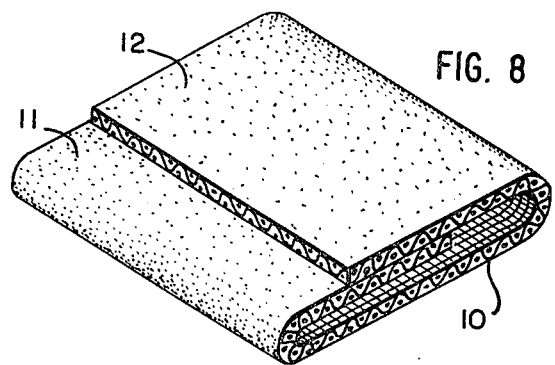

FIG. 1 is a diagrammatic view in side elevation of a machine that may be usefully employed in carrying out the process, FIG. 2 is a corresponding plan view, FIG. 3-7 are fragmentary sectional views taken on the correspondingly designated lines of FIG. 2, and FIG. 8 is a view in perspective on an enlarged scale of a section of the product.

The strip product produced as shown in FIG. 8 comprises a fiber strip or tape folded longitudinally and having an underlying central zone 10 with inwardly folded marginal zones 11 an 12. Preparatory to folding, one entire face of the tape is coated with a pressure-sensitive adhesive. The zones 11 and 12 overlie the central zone 10 and are attached throughout the width of their overlap. The product takes the shape of a collapsed and flattened tube completely coated with a tacky adhesive while its interior surfaces are untreated and so may slip, roll or wind in response to distortion of the product by exterior force.

The machine herein shown includes a carrier comprising an endless metal band 20 arranged to run on pulleys 21 and 22 over a supporting table 23. The tape is drawn in flat condition from a reel 13 and applied smoothly and symmetrically to the band 20 as shown in FIG. 2. The tape is somewhat wider than the band 20 and as it travels with the band its central zone is rolled into temporary adhesive attachment by a pressure roller 24 mounted to rotate in a pivoted arm 25 under pressure of a spring 26. The marginal zones 11 and 12 of the tape project freely beyond the edges of the band 20. The engagement of the tape at this stage is clearly shown in FIG. 3.

Figure 4:
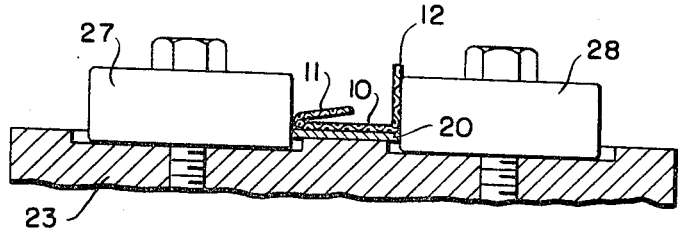
Figure 5:
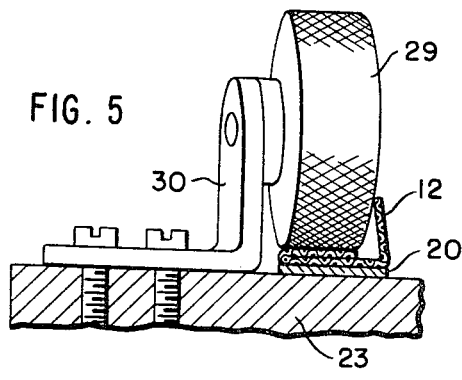

As the tape is carried along toward the right in FIG. 2 it is engaged by a pair of guide rolls 27 and 28 with the result that the nearer marginal zone 11 is folded on an acute angle above the flat central zone 10 and the further marginal zone 12 is turned into right-angular position as shown in FIG. 4.

The action of the guide roll 27 is largely controlled by a spreading roll 29 mounted upon a bracket 30 and arranged to rotate on a bias axis so that it tends always to draft the margin 11 inwardly into about the inclined position shown in FIG. 4.

Figure 6:
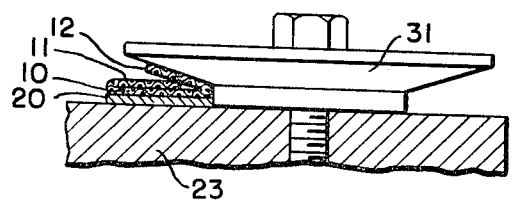
Figure 7:
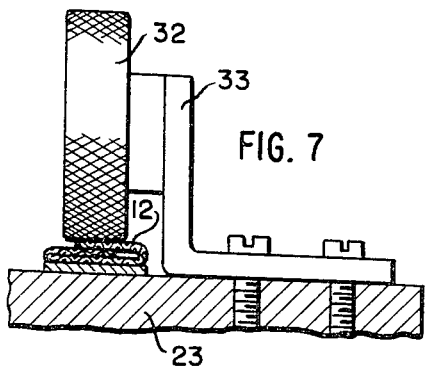

After passing the roll 29 the tape is engaged by the folding roll 31 which turns the margin 12 of the tape from the right-angular position of FIG. 4 to the inwardly inclined position of FIG. 6 in which it overlaps to some extent the marginal zone 11.

Upon leaving the folding roll the tape in the condition shown in FIG. 6 is passed beneath a presser roll 32 mounted on a bracket 33 upon the table 23 and serving to compress the now folded tape into the form of a flat compressed tube in which the overlapping margins 11 and 12 are adhesively united by the adhesive coating of the marginal zone 11 while the interior surfaces remain interiorly free of the adhesive and therefore free to slide upon each other.

Figure 3:
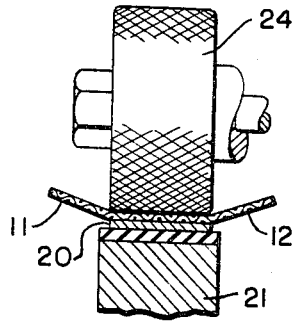

The now folded tape is advanced on the carrier band 20 beyond the table 23 and at a convenient location it is stripped from the band and may be coiled with a separator strip for storage or transportation for the immediate use by the shoe manufacturer. It will be apparent that the coated tape is under complete control throughout the process, being held in flat smooth condition by its adherence to the carrier band while its marginal zones that project beyond the edges of the band 20 as shown in FIGS. 2 and 3 are progressively folded and pressed into adhesive union.

Having thus disclosed my invention what I claim as new and desire to secure by Letters Patent is:

1. The process of making an adhesive strip fastener, characterized by the steps of feeding a tacky adhesively-coated tape, with its adhesive face down upon a traveling carrying surface, lightly securing the coated face of the tape to said surface, progressively folding one edge zone of the tape into a right angular position on the carrying surface and the other edge zone into an acute angular position, then folding both edge zones into overlapping relation upon the underlying central zone of the tape, thereby oppositely exposing exterior adhesive faces and providing oppositely disposed interior contacting faces, and stripping the folded product from the carrying surface.

2. The process of making a multi-ply adhesive strip product, characterized by the steps of feeding an adhesively coated tape to a traveling carrier, temporarily attaching the central zone of the tape in smooth condition by its coated surface to said carrier, folding inwardly the coated marginal zones of the tape in superposed relation to its underlying central zone, uniting the folded zones by pressure, thereby oppositely exposing exterior adhesive faces and providing oppositely disposed interior contacting faces, and stripping the folded product thus formed from the carrier.

3. The process of making a tubular adhesive product, characterized by temporarily attaching and stabilizing a longitudinal zone of an adhesively-coated tape upon a traveling carrier, folding inwardly adjacent zones of the tape and attaching them together above the stabilized zone of the tape but without adhesive contact therewith, thereby, oppositely exposing exterior adhesive faces and providing oppositely disposed interior contacting faces.

4. The process of making a tubular adhesive product as defined in claim 3, further characterized in that a tacky longitudinal zone of the coated tape is stabilized by temporary attachment to the surface of an endless metallic band.

5. The process of making a tubular adhesive product as defined in claim 3, further characterized in that one inwardly folded zone of the tape is subjected to a lateral spreading pressure before being adhesively attached to the other folded zone of the tape.

6. The process of making a tubular adhesive product as defined in claim 3, further characterized in that coated marginal zones of the tape are folded oppositely with coated tacky surfaces directed outwardly leaving all interior surfaces free of adhesive.

7. A tape folding machine comprising a traveling carrier presenting a smooth continuous surface, means for adhesively applying the body of a tacky tape to the carrier with marginal zones extending beyond the surface of the carrier, means for progressively folding the marginal zones of the tape into overlapping relation above the body of the tape, and means for pressing said overlapped margins into adhesive union.

8. A tape folding machine comprising a traveling carrier band, cooperating rolls for pressing into adhesive contact with the band the central zone of a tacky adhesive-coated tape, guide rolls for folding marginal zones of the tape into different angles with respect to the central zone of the tape, a folding roll for overlapping the marginal zones, and presser means for compacting the overlapping marginal zones above the central zone of the tape while the latter is being advanced by the carrier band

References Cited

UNITED STATES PATENTS

| | | | |
|---|---|---|---|
| 2,145,334 | 1/1939 | Bergstein | 156—227 XR |
| 2,584,633 | 2/1952 | Southwick | 156—202 XR |

EARL M. BERGERT, *Primary Examiner.*

H. F. EPSTEIN, *Assistant Examiner.*